(12) United States Patent
Davies et al.

(10) Patent No.: US 8,529,716 B2
(45) Date of Patent: Sep. 10, 2013

(54) METHODS FOR FORMING FRAME CORNERS

(75) Inventors: Bradley Jarrett Davies, Winnipeg (CA); Laurence William Davies, Winnipeg (CA)

(73) Assignee: Omniglass SCT Inc., Winnipeg, MB (CA)

( * ) Notice: Subject to any disclaimer, the term of this patent is extended or adjusted under 35 U.S.C. 154(b) by 0 days.

(21) Appl. No.: 13/191,332

(22) Filed: Jul. 26, 2011

(65) Prior Publication Data

US 2012/0285614 A1 Nov. 15, 2012

Related U.S. Application Data

(60) Provisional application No. 61/484,944, filed on May 11, 2011.

(51) Int. Cl.
*E04B 2/46* (2006.01)
*B29C 65/54* (2006.01)
*B32B 37/00* (2006.01)
*B32B 43/00* (2006.01)

(52) U.S. Cl.
USPC ....... 156/71; 156/293; 156/304.2; 156/307.1; 156/307.7

(58) Field of Classification Search
USPC .......... 156/71, 250, 293, 304.1, 304.2, 304.3, 156/307.1, 307.7
See application file for complete search history.

(56) References Cited

U.S. PATENT DOCUMENTS

| 6,649,726 | B1 * | 11/2003 | Kawanabe et al. | 528/64 |
| 7,241,352 | B2 * | 7/2007 | Crandell | 156/109 |
| 7,634,880 | B2 | 12/2009 | Sironko et al. | |
| 2005/0115178 | A1 | 6/2005 | Schmidt | |

FOREIGN PATENT DOCUMENTS

DE 2345881 A * 3/1975

OTHER PUBLICATIONS

English Abstract of DE 2345881 (Sep. 19, 2012).*
Machine English translation of DE 2345881 (Sep. 19, 2012).*

* cited by examiner

*Primary Examiner* — Sing P Chan
(74) *Attorney, Agent, or Firm* — Adrian S. Battison; Ade & Company Inc.

(57) ABSTRACT

Methods and systems for forming a frame, such as door and window frames, are provided. In some implementations, a method for forming a frame includes clamping the frame on a rotation device, the frame having a plurality of frame members and a plurality of corners defined by the plurality of frame members. The rotation device is for rotating the frame and providing a liquid material into each corner of the frame through injection holes formed in frame members. The liquid material sets to form a solid structural member bridging and connecting the frame members. The liquid is poured into the corner area with the corner at the bottom and the members diverging upwardly and outwardly therefrom and the liquid material has a viscosity so that it settles to form a level height into and across each frame member but does not leak from the butting surfaces of the members.

19 Claims, 8 Drawing Sheets

METHODS FOR FORMING FRAME CORNERS

CROSS-REFERENCE

This application claims the benefit of U.S. Provisional Application No. 61/484,944 filed on May 11 2011, which is entirely incorporated herein by reference.

BACKGROUND OF THE INVENTION

A window is a transparent opening in a wall or door that allows the passage of light and, if not closed or sealed, air and sound. Windows may be glazed or covered with some other transparent or translucent material. Windows may be held in place by frames, which prevent them from collapsing in. Certain glazed windows may be opened, to allow ventilation, or closed, to exclude inclement weather.

Window frames may include corner keys and lineal profiles. A lineal profile may be a sash profile or a frame profile. Window frames and doorframes typically include a plurality of mainframe profiles. In a typical window frame, the top frame profile is usually identified as the header, the bottom frame profile as the sill, and the remaining two side profiles as the side jambs.

Window frames may include corner keys to connect sash or frame profiles together.

SUMMARY OF THE INVENTION

The present invention therefore provides a method for forming a frame in which a plurality of lineals are provided each defined by a peripheral wall having interior surfaces defining a hollow interior. The lineal is preferably closed, that is the wall fully surrounds the hollow interior, but in some cases the wall may be partly open forming a longitudinal gap which may be allowed.

Provided herein are methods for forming frames, including corners of frames. In some embodiments, methods are provided for forming corners of a frame of the type defined by connected lineals, where the lineals each have at least a part or portion defining a hollow interior.

In some embodiments, the invention is directed to windows, doors or other fenestration products but may include any frame where the frame is formed from lineals connected at the ends to form a corner.

In some embodiments, the invention is directed to lineals formed from pultruded material. Methods provided herein enable the formation of lineals in a manner that reduces, if not eliminates, problems with manufacturing methods currently available, such as the tendency for pultruded materials to crack in response to loads in the transverse direction, such as from screws. Methods provided herein may be applied to other materials, such as polyvinyl chloride (PVC) or aluminum, which may be extruded.

The present invention provides methods for forming a frame in which a plurality of lineals are provided each defined by a peripheral wall having interior surfaces defining a hollow interior. The lineal in some cases is closed, that is the wall fully surrounds the hollow interior, but in other cases the wall may be partly open, thereby forming a longitudinal gap.

Corners are formed between the lineals so as to complete the frame defined by a plurality of the lineals and a plurality of corners between the lineals. This may be carried out by clamping the system to hold the lineals in place and by rotating the clamped structure so that each corner in turn is moved to a bottom location.

The lineals may be formed from any material, including pultruded materials, such as a set resin (e.g., polyester or urethane), reinforced with longitudinally extending fiber materials, such as glass rovings and mat in view of the difficulty of fabricating corners for pultruded lineals.

In an embodiment, each corner is formed by the steps of: a) cutting the lineals at each end so that the lineals can be butted. This may be accomplished where the lineals are of the same cross-section by mitering each end so that the edges of one directly butt with the edges of the other. However his is not essential and the lineals can be of different cross-section and an end of the first is butted to a face of the second, the face of the second is arranged to include an opening communicating with the hollow interior of the second and the second is capped to close the end thereof; b) butting the end of the first lineal with the second lineal at the corner so that an edge of the peripheral wall of the first lineal contacts the second lineal with the hollow interior of the first lineal being in communication with the hollow interior of the second lineal; c) arranging the corner with the corner at the bottom and with the first and second lineals diverging upwardly and outwardly from the corner; d) introducing into the corner a settable liquid material so as to collect at the butting peripheral walls at the corner and to extend from the butting peripheral walls upwardly at least partly into the first and second lineals to a distance to fill the hollow interiors or the first and second lineals at the corner; e) providing in the liquid a viscosity selected (i.e., selecting a liquid having a viscosity) so that the liquid flows to a position within the first and second lineals which is substantially at the same height; f) causing the liquid to set into a solid material; g) arranging the solid material so that the solid material forms a structural member extending between the first and second lineals to hold the lineals connected at the corner; and h) arranging the solid material so that the solid material bonds to the interior surfaces of the lineals to hold the lineals against separation.

The liquid may be selected so that it has a viscosity sufficient so that the liquid is held by its viscosity from escaping between the butting edges of the peripheral walls. Many different liquids may be selected to meet these criteria or may be modified to meet the criteria. In an embodiment, the settable liquid material is a two-part urethane resin, which is mixed before (e.g., immediately before) introducing the settable material into the corner and sets by catalytic curing to form the solid material in a time period less than about 1 minute, or less than about 10 seconds, that is, substantially immediately after it has settled to reach the self leveled condition.

In some cases, a polyurethane resin sold by Huntsman is used. Its viscosity may be set to a required level by the manufacturer by adding a required constituent of an inert filler such as calcium carbonate. The suitable viscosity is of the order of that of a liquid honey which is 10 mPascal-seconds (mPA-S) at room temperature.

In an embodiment, for simplicity of operation and construction of the assembly machine, the liquid is prevented from escaping between the butting edges by ensuring that the edges are accurately cut to avoid larger spaces and by selecting the viscosity of the liquid so that its viscosity alone is sufficient to prevent escape. The viscosity may be adjusted relative to the curing time and the flow rate by selecting different formulations of resin and by selecting an amount of filler. This viscosity has been found to allow the material to self level within a few seconds and to avoid leaking from the butting edges at the joint.

However, as an alternative or as an additional step, a layer of a sealant material may be provided between the butting edges to assist in preventing the escape of the liquid from the interior of the corner through the butting edges. Such a sealant is applied by contacting one end of one of the lineals with a carrier of the sealant so that a thin layer is applied to the one end and then located between the ends when they are brought together. This sealant may assist the prevention of the escape of the liquid. As a further alternative or addition, a silicone gasket member is brought up to the exterior of the butting edges, as part of the clamping system, to butt against the corner during the pouring of the liquid to hold the liquid contained until it is set. Different sealants may be used and may remain in place after the corner is completed to assist in sealing the corner construction against air or moisture penetration.

In some case, this material is cured catalytically after a predetermined time period related to the time necessary to settle to the same height and the time available in the manufacturing process. This time may be determined by simple experimentation and can be set by the manufacturer using selections of catalyst and ratios in accordance with well known principles. The time of curing action can be decreased by application of heat or other energy.

In order to help maximize throughput on the assembly machine, it is highly desirable that the set up time before which the corner can be moved from the initial orientation is on the order of 1 second to 1 minute, or 15 to 20 seconds. This time period is selected so as to allow the corner to be moved into the required location, for the liquid to be injected and to flow to its required location at the required heights before its viscosity increases as the curing action occurs. This time period is also selected to avoid wait times in the process after the pouring has occurred and before the liquid is sufficiently set to allow the corner to be moved from its required orientation. This time period in some cases is selected to maximize productivity. It is not necessary that the liquid be fully cured before the corner is moved since it remains held in a clamping system during this time so that complete curing to the required strength may occur after movement but before release from the clamping system.

The liquid forming the solid material is selected from one or more resins which provide the above characteristics of viscosity, strength and bonding effect. In some situations, the liquid forming the solid material is a urethane material. Simple experimentation will allow the selection from the multitude of available materials which will provide the strength required and the bond strength required in the finished solid structural member at the corner depending of course on the use to which the frame is to be put. The material may be cured by catalytic action without additional external energy. In some situations, however, the material is cured without the use of a catalyst, such as by air drying or annealing. It is also possible to use external energy by heat, by ultrasonic, ultraviolet light, microwave or other energy. The material may be thermosetting or may be thermoplastic such as a traditional hot melt material provided it is heated sufficiently to provide the initial required viscosity in the liquid state and to cool to as set condition in sufficient time.

Where the curing action is exothermic, the amount of heat generated which may create significant heating of the frame at the corner is arranged so that it does not exceed the tolerance of the lineals or any coating on the lineals. The temperature generally may reach 300 degrees F. or more without damaging the pultruded lineal or a baked coating.

It will be appreciated that the present invention is not limited to windows where the strength requirements are low but may be used in other structures, such as industrial or larger doors where a significantly higher level of structural and bond strength is required.

With selection of the suitable viscosity as set out above, the solid material seals the corner to prevent air or moisture penetration through the frame at the corner.

The liquid should be introduced to an amount to just cover the whole of the butting edges of the peripheral walls. That is it reaches a level just above the butting edges and extends a very short distance beyond that into the lineals themselves. However it is not intended that the solid material extends through the full extent of the first and second lineals so that for most reduced cost the material extends only to a minimal amount beyond the location where it covers the butting edges.

As it is supplied as a liquid and may access all interior surfaces, the solid material bonds to all of the interior surfaces of the first and second lineals.

In some embodiments, the solid material is selected to provide the required (or predetermined) structural strength. In such cases, the structural member at the corner is formed solely by the solid material. That is, in some cases the structural strength required is met by the material itself. However in other cases where a higher level of strength is required, it may be desirable to insert or bury a reinforcing element such as a stamped metal member into the solid material. This member does not form the corner member but merely reinforces the structural member such as rebar in concrete.

The insert member may be located within the solid material during the pouring of the liquid by providing on said at least one insert projecting elements for engaging at least one of the interior the surfaces of the first and second lineals with the projecting elements extending over a limited extent of said at least one surface to allow the liquid to engage each of the interior surfaces of the first and second lineals. That is finger members engaging the surfaces hold the insert in place but do not act to cause jamming of the insert against opposed surfaces which would interfere with the entry of the liquid to all surfaces. That is, the insert does not fill the hollow interior but merely sits in the hollow interior at a required location until the liquid is poured around it.

In other embodiments the solid material may contain one or more inserts or filler elements which act to reduce the thermal conductivity of the frame at the corner by providing a volume within the solid material of reduced thermal conductivity.

In an embodiment, the liquid is introduced through a hole drilled in at least one of the first and second lineals adjacent the corner. The liquid may be poured from a vessel or from an injector system but is not necessarily under pressure when injected as its viscosity is such that it can flow freely to the self leveled condition thus avoiding the necessity for pressure injection. A measured dose is applied in a manufacturing situation since the amount required to reach the required settled height can be easily calculated.

In some situations, a corner member formed wholly from structural foam may be insufficient to provide the required strength. In some situations, the liquid is arranged such that it does not form a foam. That is the two part urethane material set out above forms a solid material with substantially no voids. The resin or material forming the liquid is arranged such that at least a part of the solid material is not formed from a foam to form the structural member. Urethane resins have a tendency to foam even if not intended and hence it is desirable to ensure that foaming is not encouraged so that the bulk of the corner member is solid without voids even if a part of the material at the upper surface is foamed.

The amount of foaming of a urethane resin may be controlled by adding controlled quantities of water. In some cases the liquid is arranged such that the solid material foams to provide voids within the solid material.

Thus the amount of voids or foaming of the resin may be controlled to ensure that a strength of the corner to resist bending, as defined by the structural member, meets known industry standards. In some cases this can be achieved while including some voids where the amount of voids is insufficient to weaken the corner to less than the acceptable level while the amount of voids is sufficient to reduce the thermal conductivity. Simple experimentation may allow a user to tailor the setting of the resin to achieve the amount of foaming required to provide the strength to thermal conductivity ratio required, depending on the end use of the frame.

According to another aspect of the invention there is provided a method for forming a frame comprising: providing at least three lineals including a first, second and third lineal each defined by a peripheral wall having interior surfaces defining a hollow interior; and forming at least two corners between the lineals including a first corner and a second corner so as to form the frame defined by said at least three lineals and said at least two corners between the lineals; wherein said first and second corners are formed by the steps of: butting an end of the first lineal with the second lineal at the first corner so that an edge of the peripheral wall of the first lineal contacts the second lineal with the hollow interior of the first lineal being in communication with the hollow interior of the second lineal; butting an end of the second lineal with the third lineal at the second corner so that an edge of the peripheral wall of the second lineal contacts the third lineal with the hollow interior of the second lineal being in communication with the hollow interior of the third lineal; orienting the frame so that the first corner with the butting peripheral walls of the first and second lineals is arranged at a bottom with the first and second lineals diverging upwardly and outwardly from the first corner; introducing into the first corner a first dose of a settable liquid material so as to collect at the first corner and to extend from the first corner upwardly at least partly into the first and second lineals to a distance to a level to fill the hollow interiors of the first and second lineals at the first corner; causing the first dose of the settable liquid to set into a solid material; orienting the frame so that the second corner with the butting peripheral walls of the second and third lineals is arranged at the bottom with the second and third lineals diverging upwardly and outwardly from the second corner; introducing into the second corner a second dose of the settable liquid material so as to collect at the second corner and to extend from the second corner upwardly at least partly into the first and second lineals to a distance to a level to fill the hollow interiors of the second and third lineals at the second corner; and causing the second dose of the settable liquid to set into a solid material.

An aspect of the invention provides methods for forming window or door frames. In an embodiment, a method for forming a window frame comprises the steps of: (a) injecting a settable material (or bonding material) into a first corner defined by a first frame member and a second frame member; (b) rotating the window frame; (c) injecting the bonding material into a second corner defined by the second frame member and a third frame member; (d) rotating the window frame; (e) injecting the bonding material into a third corner defined by the third frame member and a fourth frame member; (f) rotating the window frame; and (g) injecting the bonding material into a fourth corner defined by the fourth frame member and the first frame member or a fifth frame member. The settable material in some situations is a settable liquid material.

In another embodiment, a method for forming a window frame from a nascent window frame comprises bringing a plurality of frame members in proximity to one another to form a nascent window frame having a plurality of corners, the nascent window frame including a first frame member and second frame member forming a first corner at an intersection of the first and second frame members. Next, a bonding material is injected into the first corner, the bonding material for fixing the first frame member to the second frame member. The nascent window frame is then rotated. Additional bonding material may be injected into other corners of the nascent window frame to form the window frame.

In another embodiment, a method for forming a keyless frame comprises providing a nascent frame on a rotation device, the nascent frame comprising a plurality of frame members and a plurality of corners defined by the plurality of frame members, wherein the rotation device is for rotating the nascent frame. Next, a bonding material is provided into each of the plurality of corners, the bonding material for fixing adjacent frame members to one another. The bonding material is permitted to set to form the frame.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
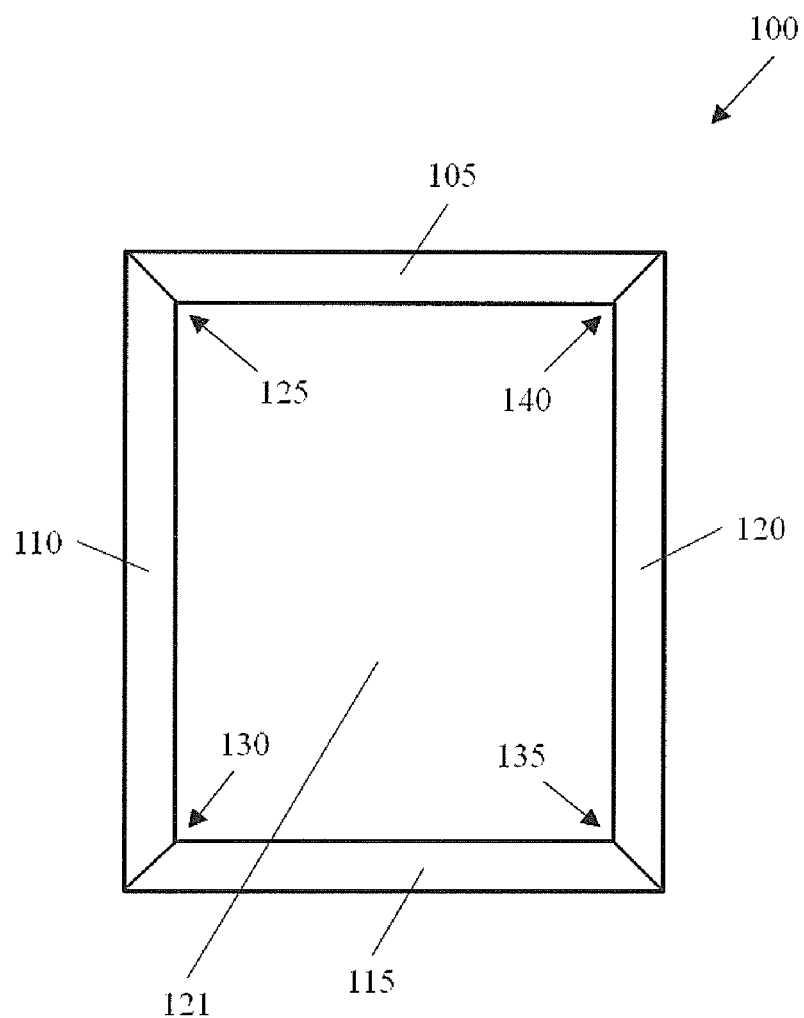
FIG. 1 schematically illustrates a frame, such as a door or window frame, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed in practicing the invention.

Methods and systems provided herein enable the formation of frames without the use of corner keys, thereby enabling savings in materials and processing costs. Provided herein are methods and systems for forming keyless window frames, door frames and other frames that may streamline current methods for forming frames.

The term "frame member," as used herein, refers to frame profiles and other structural components for defining a frame, such as a window frame or door frame. A window frame may include a plurality of frame members. For instance, a square or rectangular window frame includes four frame members, which may also be referred to as frame profiles. In some situations, a frame member is a sash or frame profile. In some instances, a frame member is a single-piece unit or component. In other instances, a frame member includes a plurality of pieces, such as two conjoined pieces.

The term "lineal," as used herein, refers to a part or component of a frame. A frame is defined by one or more lineals. In some cases, a lineal is a frame member, which may include frame profiles. In an example, a window frame with four frame members includes four lineals.

The term "nascent," as used herein, refers to a structure that is not fully formed. For instance a nascent frame, such as a nascent door or window frame, is a frame that has not been fully formed. A nascent frame may be a frame that is up to about 1% to completion, or up to about 5% to completion, or up to about 10% to completion, or up to about 15% to completion, or up to about 20% to completion, or up to about 15% to completion, or up to about 20% to completion, or up to about 25% to completion, or up to about 30% to completion, or up to about 35% to completion, or up to about 40% to completion, or up to about 45% to completion, or up to about 50% to completion, or up to about 55% to completion, or up to about 60% to completion, or up to about 65% to completion, or up to about 70% to completion, or up to about 75% to completion, or up to about 80% to completion, or up to about 85% to completion, or up to about 90% to completion, or up to about 95% to completion, or up to about 99% to completion. A nascent frame may require additional components or processing to reach completion. In an example, a frame with two out of four frame members (or lineals) joined to one another at a corner, but requiring further processing to join the remaining frame members, may be referred to as a nascent frame.

The term "solid," as used herein, refers to a material that is in the physical state of being solid as opposed to being flowable as a liquid.

The term "settable material," as used herein refers to a substance which may set to form a solid material that is arranged to provide, when solid, a structural corner member uniting the two lineals. A settable material in some cases is a settable liquid material. The liquid may have a viscosity selected so that the liquid does not flow out during the process of forming a corner and prior to setting. In some cases, however, the liquid has a viscosity selected so that the liquid flows to a position within the first and second lineals which is substantially at the same height.

The term "bonding material," as used herein, refers to one or more fluid, semi-fluid, gaseous, solid or semi-solid materials, such as chemicals, for attaching structural components together. A bonding material in some cases is a settable material, such as a settable liquid material. In an example, a bonding material is a polymeric material. A bonding material may be thermosetting polymer (or polymeric material), such as an epoxy (e.g., two-component epoxy). A bonding may be formed of one or more components, such as one or more of solvents, flexibilizers, viscosity reducers, colorants, thickeners, accelerators and adhesion promoters. Such components may be volatile or non-volatile. In some cases, a bonding material may cure or harden to a solid or semi-solid mass.

The viscosity of the liquid when introduced is selected so that it has the above characteristics above. Many different liquids can be selected to meet these criteria or can be modified to meet the criteria. The preferred material selected for the best mode is a two part urethane resin which is mixed immediately before introducing into the corner and sets up by catalytic curing to form the solid material in a time period less than 1 minute, and preferably less than 30 seconds, that is, substantially immediately after it has settled to reach the self leveled condition.

Urethane resins sold Huntsman of Auburn Hills Mich. 48326 USA are suitable.

A specific example of their resins which has been used and found to be entirely acceptable uses as a Resin Suprasec 9701 isocyanate which can be used for pultrusion or casting and uses as a catalyst RIMLine SK 97014 MOD which is a catalyst designed for casting which is used in a mix ratio of 1.47/1 resin to catalyst.

The viscosity of the mixture when in liquid form can be set to a required level by the manufacturer by adding a required constituent of an inert filler such as calcium carbonate. The suitable viscosity is of the order of that of a liquid honey which is 10 mPA-S (mPascal-seconds) at room temperature. This material is cured catalytically after a predetermined time period related to the time necessary to settle to the same height and the time available in the manufacturing process. This time can be determined by simple experimentation and can be set by the manufacturer using selections of catalyst and ratios in accordance with well known principles.

This viscosity has been found to allow the material to self level within a few seconds and to avoid leaking from the butting edges at the joint.

The term "position", as used herein, may refer to an angular position of a frame in relation to a fixed axis parallel to a plane of the frame. For example, a first position and second position of a frame may be angularly disposed in relation to one another. The first position may be at a first corner of the frame and the second position may be at a second corner of the frame. For a frame having four frame members (or profiles, sashes), the first and second corners may be 90° in relation to one another along a fixed axis parallel to a plane of the frame.

Reference will now be made to the figures, wherein like numerals refer to like parts throughout. It will be appreciated that the figures are not necessarily drawn to scale.

FIG. 1 shows a frame 100 having a first frame members 105, second frame member 110, third frame member 115 and fourth frame member 120. The frame 100 may be a window frame or door frame. The frame 100 includes an opening 121 for accepting a component desired to be supported by the frame 100, such as a glass piece, metal piece, wood piece, photovoltaic module, or an electronic component, such as a circuit board. The opening 121 is defined by the frame members 105, 110, 115 and 120. The number of frame elements or lineals can vary depending on the required shape of the frame. The frame can include transverse additional frame elements spanning from one side to the other. Some of the corners of the frame can be formed using other techniques and it is not necessary that all corners of the frame are formed using the technique described herein. Thus some of the lineals of the frame may be formed of different material and different structures requiring different techniques for forming the corner.

The frame members define corners at intersections or endpoints of the frame members. For instance, the first frame member 105 and second frame member 110 define a first corner 125. The second frame member 110 and third frame member 115 define a second corner 130. The third frame member 115 and fourth frame member 120 define a third corner 135. The fourth frame member 120 and first frame member 105 define a fourth corner 140.

A frame member may be joined (or attached) to an adjacent frame member with the aid of a settable material (or bonding material), such as a settable liquid material. For instance, the first frame member 105 may be joined to the second frame member 110, the second frame member 110 may be joined to the third frame member 115, the third frame member 115 may be joined to the fourth frame member 120, and the fourth frame member 120 may be joined to the first frame member with the aid of the settable liquid material. Adjacent frame members may be connected to one another at the corners of the frame members. For instance, the first frame member 105 may be connected to the second frame member 110 at the first corner 125, the second frame member 110 may be connected to the third frame member 115 at the second corner 130, the third frame member 115 may be connected to the fourth frame member 120 at the third corner 135, and the fourth frame member 120 may be connected to the first frame member 105 at the fourth corner 140.

The frame members 105, 110, 115, and 120 may each have one or more internal cavities (or passages) for accommodating the settable liquid material. In some cases, the frame members may be hollow, and an injection hole may be formed or provided in at least some of the frame members. The injection hole in such a case is in fluid communication with an internal passage or cavity of a frame member. In some implementations, the settable liquid material may enter such passages and form a solid, semi-solid or foam material to connect one frame member to another.

Use of a settable liquid material, as described herein, advantageously precludes the need for corner keys. In some instances, this reduces considerable processing time and effort, which may lead to increases in costs and waste.

Figure 2:
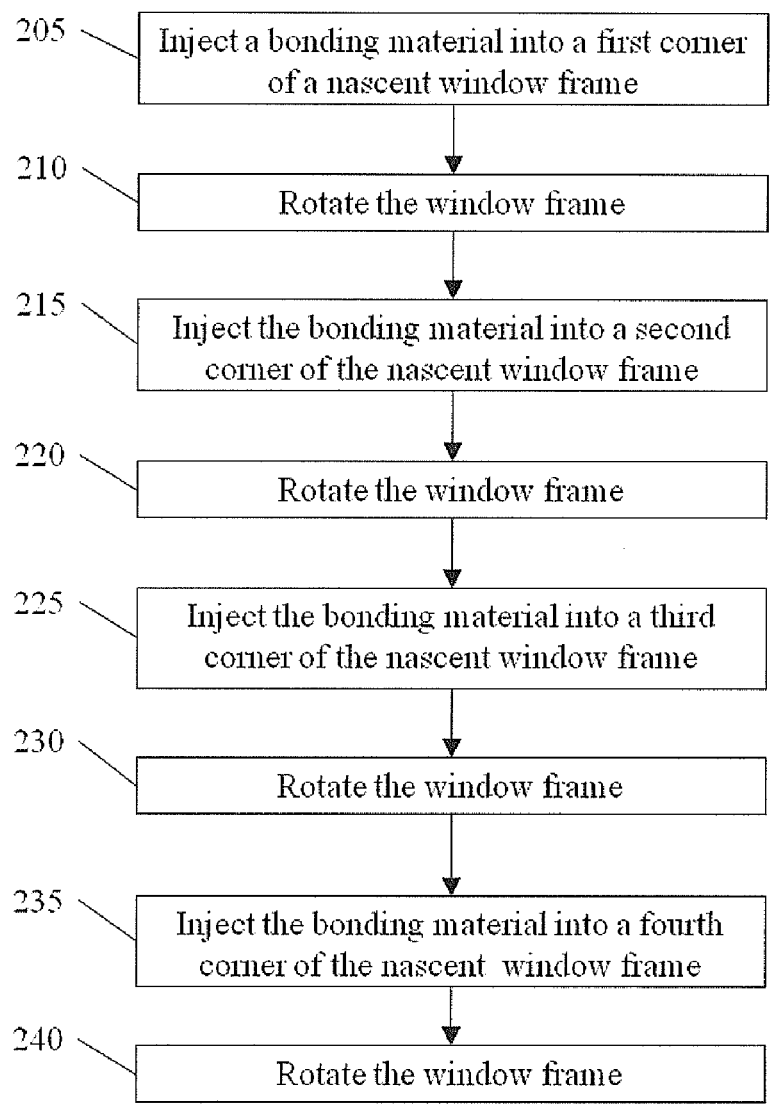
FIG. 2 schematically illustrates a method for forming a frame, in accordance with an embodiment of the invention.

FIG. 2 shows a method 200 for forming a window frame from a window frame, in accordance with an embodiment of the invention. The window frame includes a first frame member, second frame member, third frame member and fourth frame member. Such frame members may be as described above in the context of FIG. 1. That is, the first and second frame members define a first corner of the window frame; the second and third frame members define a second corner of the window frame; the third and fourth frame members define a third corner of the window frame; and the fourth and first frame members define a fourth corner of the window frame. Alternatively, in cases in which the window frame includes more than four frame members, the fourth and a fifth frame member define the fourth corner.

A frame may be formed in any geometric shape, such as, for example, triangular, boxlike, rectangular, pentagonal, hexagonal, heptagonal, or octagonal. A frame may generally include 2, or 3, or 4 or 5, or 6, or 7, or 8, or 9, or 10, or 11, or 12, or more sides. The sides may be disposed about a circumference of the frame.

In a first step 205, with the window frame in a first position, a settable liquid material is injected into a first corner of a window frame. The settable liquid material may be injected through one or more orifices or holes in the first or second frame member of the window frame, or a plurality of orifices or holes in the first and second frame members of the window frame. The settable liquid material may be injected through one or more holes or orifices for enabling the settable liquid material to reach an interior portion of the first corner defined by the first and second frame members.

In some cases, the settable liquid material may be injected along an axis parallel to the gravitational force of attraction (i.e., along the gravitational acceleration vector, or "downward"). In such a case, the window frame may be oriented such that the first corner has the one or more orifices with their openings pointing upward. Alternatively, the settable liquid material may be injected along an axis orthogonal to the gravitational acceleration vector. In some instances, the settable liquid material may be injected along an axis that is about 5°, 10°, 15°, 20°, 25°, 30°, 35°, 40°, 45°, 50°, 55°, 60°, 65°, 70°, 75°, 80°, or 85° from the axis orthogonal to the gravitational acceleration vector. In other cases, the settable liquid material may be injected along an axis anti-parallel to the gravitational force of attraction (i.e., parallel to, but in a direction opposite, the gravitational acceleration vector, or "upward"). In such a case, the settable liquid material may be provided with the aid of a pressurized fluid, such as a gas or liquid, or with the aid of a pump, compressor, or other pressure source or device for providing mechanical energy to the settable liquid material.

The settable liquid material may be injected with the aid of a machine for dispensing the settable liquid material. For example, the settable liquid material may be provided with the aid of a glue or epoxy dispenser.

Next, in a second step 210, the window frame is rotated to a second position. Generally, the second position is disposed by about 360/n degrees with respect to the first position, wherein 'n' is the number of frame members in the window frame. For instance, if the window frame has four frame members, the second position may be angularly separated by about 90° with respect to the first position.

Next, in a third step 215, the settable liquid material is injected into the second corner of the window frame. The settable liquid material may be injected through one or more holes or orifices provided in one or both of the second and third frame members. The settable liquid material may be injected through one or more holes or orifices for enabling the settable liquid material to reach an interior portion of the second corner defined by the second and third frame members.

Next, in a fourth step 220, the window frame is rotated to a third position. If the window frame has four frame members, the third position may be angularly separated by about 90° with respect to the second position.

Next, in a fifth step 225, the settable liquid material is injected into the third corner of the window frame. The settable liquid material may be injected through one or more holes or orifices provided in one or both of the third and fourth frame members. The settable liquid material may be injected through one or more holes or orifices for enabling the settable liquid material to reach an interior portion of the third corner defined by the third and fourth frame members.

Next, in a sixth step 230, the window frame is rotated to a fourth position. If the window frame has four frame members, the fourth position may be angularly separated by about 90° with respect to the third position.

Next, in a seventh step 235, the settable liquid material is injected into the fourth corner of the window frame. The settable liquid material may be injected through one or more holes or orifices provided in one or both of the fourth and first frame members. The settable liquid material may be injected through one or more holes or orifices for enabling the settable liquid material to reach an interior portion of the fourth corner defined by the fourth and first frame members.

Next, in an eight step 240, the window frame may be rotated. In some cases, the window frame may be rotated to repeat one or more of the first, second, third, fourth, fifth, sixth or seventh steps, as described above. Alternatively, the window frame may be rotated to enable the bonding member to uniformly cover the interior of the corners of the frame members of the window frame. In addition, such rotation may enable the bonding member to coat other internal passages of the window frame.

The window frame may be cured in air (or an $N_2$ and/or $O_2$-containing atmosphere), an inert gas (e.g., He, Ar, Ne, $N_2$), an oxidizing environment, or under a plasma, such as an inert gas, oxygen or hydrogen plasma. The window frame may be heat dried or annealed, which in some cases may facilitate the drying process. In some situations, heat drying may evaporate one or more solvents or other chemical constituents of the settable liquid material, thereby facilitating drying or curing. In some implementations, heat may be used to accelerate the curing of the material, with the amount of heat being selected in accordance with the known characteristics in this art. In some cases, the window frame is dried for a period of at least about 1 second, or 10 seconds, or 20 seconds, or 30 seconds, or 1 minute, or 2 minutes, or 3 minutes, or 4 minutes, or 5 minutes, or 6 minutes, or 7 minutes, or 8 minutes, or 9 minutes, or 10 minutes, or 20 minutes, or 30 minutes, or 40 minutes, or 50 minutes, or 1 hour, or 2 hours, or 3 hours, or 4 hours, or 5 hours, or 6 hours, or 7 hours, or 8 hours, or 9 hours, or 10 hours, or 11 hours, or 12 hours, or 13 hours, or 14 hours, or 15 hours, or 16 hours, or 17 hours, or 18 hours, or 19 hours, or 20 hours, or 21 hours, or 22 hours, or 23 hours, or 1 day, or 2 days, or 3 days, or 4 days, or 5 days, or 6 days, or 1 week, or 2 weeks, or 3 weeks, or 4 weeks, or 1 month.

Once a settable liquid material has been provided in all corners of the window frame and set, any orifices or injections holes in the frame members of the window frame may be filled or sealed. In some cases, the orifices or injections holes may be sealed with the aid of a polymeric material, such as a thermosetting polymer (e.g., an epoxy).

The method 200 may be modified for a window frame having any number of frame members. For example, if a window frame includes two frame members, the window frame may not need to be rotated. As another example, if a window frame includes five frame members circumferentially disposed in relation to one another (e.g., a pentagonal window frame), the window frame may be rotated in about 72° increments to and from a position having an application member or device for providing a settable liquid material. Generally, the window frame may be rotated in 360/n increments, with 'n' designating the number of frame members of the window frame that are circumferentially disposed in relation to one another. For example, for a window frame having six frame members (and six corners) circumferentially disposed in relation to one another, the window frame may be rotated in 60° increments. As such, each of the six corners may be brought to a position for providing a settable liquid material to the corners, the position including an application member or device for providing the settable liquid material (see FIG. 3A).

With continued reference to FIG. 2, the method 200 may be facilitated by a device (or machine) for holding the window frame, including the frame members of the window frame. The machine may hold the window frame such that a plane having the window frame is parallel to an axis having (or parallel to) the gravitational acceleration vector ($\dot{g}$). Alternatively, the machine may hold the window frame such that a plane having the window frame is orthogonal to the axis having the gravitational acceleration vector. In an example, the device holds the nascent window frame along a direction that is about 5°, 10°, 15°, 20°, 25°, 30°, 35°, 40°, 45°, 50°, 55°, 60°, 65°, 70°, 75°, 80°, or 85° from the axis having the gravitational acceleration vector.

In addition to a device for holding the window frame, the method 200 may be facilitated by a device or machine for providing the settable liquid material. In some situations, such device may provide the settable liquid material with the aid of a pressurized fluid (gas, liquid), such as with the aid of a pressurized gas.

Figure 3A:
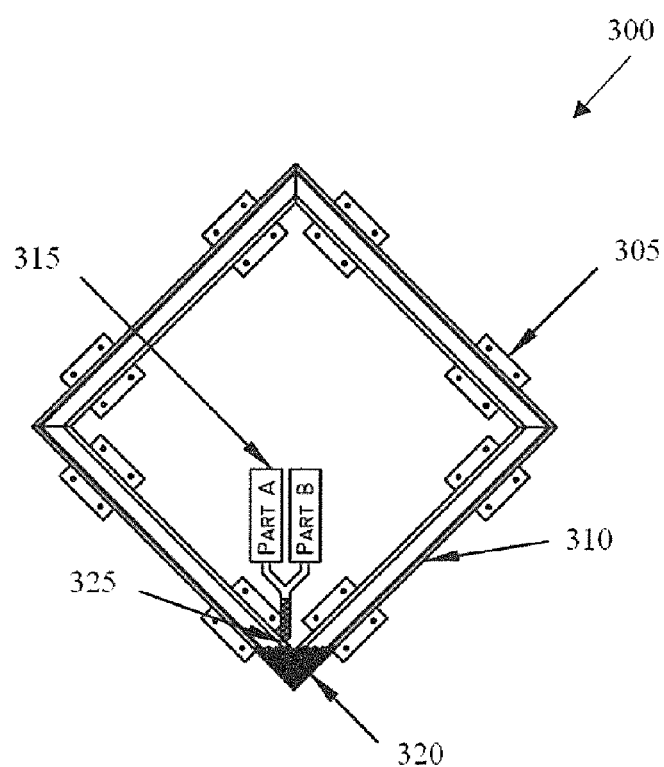
FIG. 3A schematically illustrates a device for providing a settable liquid material in a first corner of a frame, in accordance with an embodiment of the invention.

FIG. 3A schematically illustrates a device 300 for forming a frame from a frame, in accordance with an embodiment of the invention. The frame may be for use with windows ("window frame") or doors ("door frame"). The device 300 includes a plurality of clamps 305 for holding frame members 310 (four frame members 310 illustrated) of a window frame defined at least in part by the frame members. The clamps 305 may be pneumatically-actuated clamps. Other types of clamping systems can be used. For example, in cases in which the frame members are formed of a magnetic material, a plurality of plates for providing a magnetic field may be used to hold the frame members 310 in the device 300. The magnetic field may be provided upon the application of an electrical current to one or more wound coils.

The device 300 may hold a frame in a flat configuration such that a plane having the frame is orthogonal to the gravitational acceleration vector. Alternatively, the device 300 may hold the frame in an upright configuration such that a plane having the frame is parallel to the gravitational acceleration vector. In some instances, the device may hold the frame along a direction that is about 5°, 10°, 15°, 20°, 25°, 30°, 35°, 40°, 45°, 50°, 55°, 60°, 65°, 70°, 75°, 80°, 85°, or more from an axis orthogonal to the gravitational acceleration vector.

With continued reference to FIG. 3A, with the frame in a first position (or angular position), a settable liquid (or bonding liquid) material 315 may be provided into a first corner of the frame. The settable liquid material may include a plurality of parts, such as a first part and second part. Each part may include one or more chemicals or chemical components. For example, a first part may include one or more of monomers and low molecular weight polymers. In some instances, the settable liquid material may be a two-part thermosetting polymer, such as a two-part epoxy. A first part of the two-part thermosetting polymer may include a low molecular weight polymer, such as a polymer having a molecular weight of at most about 500 Daltons, or 1,000 Daltons, or 2,000 Daltons, or 3,000 Daltons, or 4,000 Daltons, or 5,000 Daltons, or 6,000 Daltons, or 7,000 Daltons, or 8,000 Daltons, or 9,000 Daltons, or 10,000 Daltons. The second part of the two-part epoxy may include a cross-linking agent. The cross-linking agent may react with the low molecular weight polymer to facilitate cross-linking between moieties of the low molecular weight polymer, such as moieties of adjacent polymers. This enables formation of a polymer having a higher molecular weight than its individual subunits.

In some situations, such reaction may include cross-linking to form a polymeric material. In other situations, such reaction may include evaporation of a solvent or other transfer medium. The foam or other solid mass 320 formed from the settable liquid material 315 may bond (or adhere) to internal surfaces of at least a portion of the frame members 310, including corners defined by the frame members 310. The solid mass 320 formed from the settable liquid material 315 fills the corners of the frame, thereby providing structural rigidity for holding frame members together. Alternatively, the settable liquid material 315 may form the solid material 320 following curing. In some situations, the settable liquid material 315 may be cured with the aid of heating.

Alternatively, the settable liquid material 315, including one or more components of the settable liquid material 315, may react to yield a solid or semi-solid material, such as a foam. The foam may have a viscosity greater than or equal to about $10^3$ Pa·s, or $10^4$ Pa·s, or $10^5$ Pa·s, or $10^6$ Pa·s, or $10^7$ Pa·s, or $10^8$ Pa·s, or $10^9$ Pa·s, or $10^{10}$ Pa·s.

The settable liquid material 315 may be provided through one or more injection holes 325 in the frame members 310. In some cases, the injection holes 325 may be drilled into the frame members 310. In other cases, the injections holes 325 may be pre-formed—i.e., formed in the frame members 310 upon forming the frame members 310. For instance, prior to providing the settable liquid material 315 through the one or more injection holes 325, the one or more injection holes may be formed in the frame members, such as with the aid of a drill, press, or other machine or device for providing a fluid passageway into an internal cavity in fluid communication with a corner of the frame.

In some cases, the settable liquid material (or bonding material), upon filling an internal cavity of a corner of a frame member, may expand to fill the internal cavity. In an example, the settable liquid material expands to form a foam or foam-type material. In some situations, the settable liquid material expands (volume expansion) on the order of at least 2, or at least 3, or at least 4, or at least 5, or at least 6, or at least 7, or at least 8, or at least 9, or at least 10, or at least 20, or at least 30, or at least 40, or at least 50, or at least 100 times its original volume. The density of the settable liquid material, upon forming a foam or other solid mass, may vary inversely with the volume.

Figure 3B:
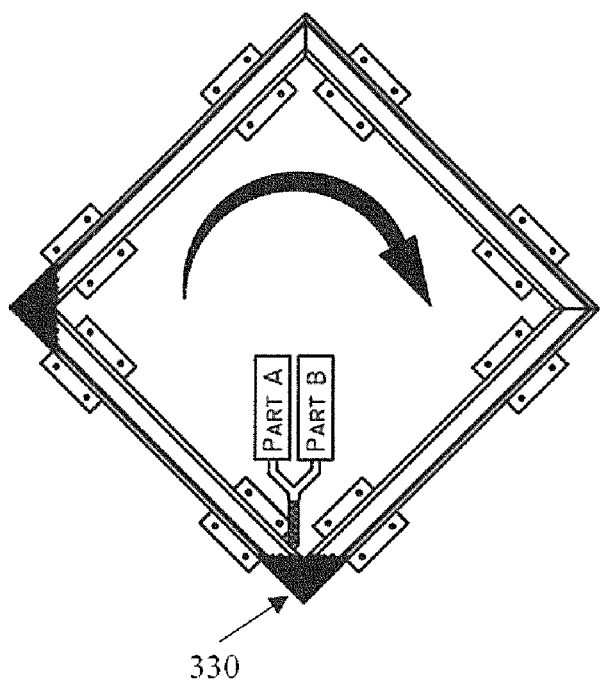
FIG. 3B schematically illustrates the device of FIG. 3A providing a settable liquid material in a second corner of the frame, in accordance with an embodiment of the invention.

With reference to FIG. 3B, with the settable liquid material 315 injected into a first corner of the frame and subsequent reaction to form, or conversion to, the foam or solid mass 320, the device 300 may rotate the frame to a second position. At the second position, the settable liquid material 315 may be injected into a second corner of the frame and allowed to form a foam or solid mass 330.

The steps of rotating the frame and injecting a settable liquid material into a corner of the frame may be repeated to yield a completed frame. For example, in the illustrated embodiment of FIG. 3B, the steps of rotating the frame and injecting a settable liquid material 315 may be repeated twice to yield a completed frame. In such a case, the frame may be rotated to a third position in which the settable liquid material 315 is injected into a third corner of the frame, and subsequently rotated to a fourth position in which the settable liquid material 315 is injected into a fourth corner of the frame.

In some situations, subsequent to injecting the settable liquid material 315 into the corners of a frame, the frame may be dried or thermally annealed to set the settable liquid material. In an example, the frame is aid dried over a time period of at least 1 minute, or 10 minutes, or 30 minutes, or 1 hour, or 2 hours, or 3 hours, or 4 hours, or 5 hours, or 6 hours, or 12 hours, or 1 day, or 2 days, or 3 days, or 4 days, or 5 days, or 6 days, or 1 week, or 2 weeks, or 3 weeks, or 1 month, or more.

As an alternative, frame members in a window frame (or nascent window frame) may be joined to one another with the aid of a bonding member initially provided in the frame members. This may preclude the need to inject bonding members into the frame members. In one instance, the bonding material may be provided in solid or liquid form in the frame members prior to assembly of the nascent window frame. Subsequent to the assembly of the nascent window frame, the bonding material may be liquefied or reduced in viscosity, such as by heating, to enable the bonding material to flow and fill or cover the corners of the nascent window frame. The bonding material may then be allowed to solidify.

Figure 4:
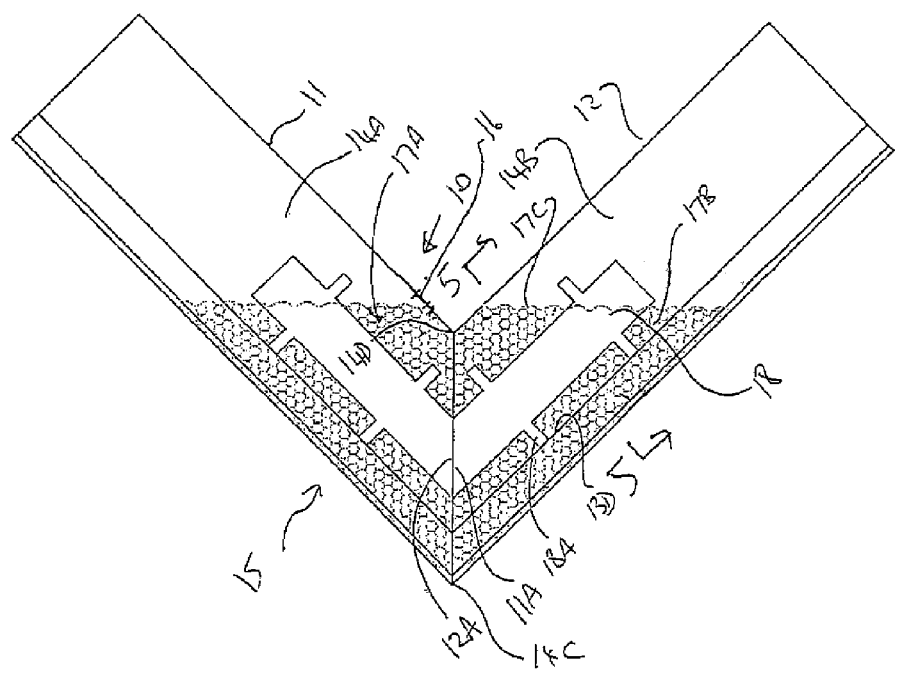
FIG. 4 is a cross-sectional view through a further embodiment of the invention including a reinforcing member within the solid material forming the structural corner member.
Figure 5:
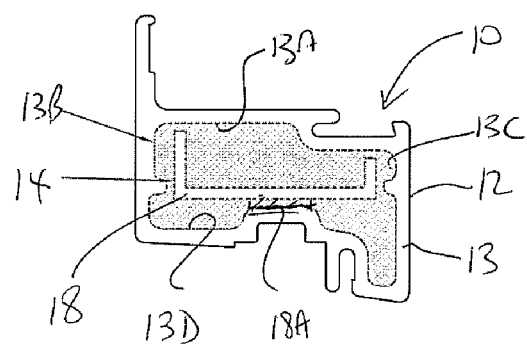
FIG. 5 is a cross-sectional view along the lines 5-5 of FIG. 4.

Turning now to FIGS. 4 and 5, there is shown a frame 10 in which a plurality of lineals 11, 12 are provided each defined by a peripheral wall 13 having interior surfaces 13A, 13B, 13C, 13D defining a hollow interior 14. The lineals 11, 12 are closed, that is, the wall fully surrounds the hollow interior.

Corners 15 are formed between the lineals 11, 12 so as to complete the frame 10 defined by a plurality of the lineals 11, 12 and a plurality of corners 15 between the lineals. This may be carried out, as described herein, by clamping the system to hold the lineals in place and by rotating the clamped structure so that each corner in turn is moved to a bottom location.

The lineals 11, 12 may be formed from any material. In an embodiment, the lineals are formed from pultruded materials. Pultrusion may be used in cases in which a lineal is of constant cross-section. Pultrusions are formed from a set resin, such as polyester or urethane, reinforced with longitudinally extending fiber materials, such as glass rovings and mat.

As shown in FIG. 4, the lineals 11, 12 are cut to form mitered end faces or edges 11A and 12A which directly match because the lineals are of identical cross-section. Thus the lineals are of the same cross-section and cut by mitering each end so that the edges 11A of one directly butt with the edges 12A of the other.

The end 11A of the first lineal is butted with the end 12A second lineal at the corner 15 with the hollow interior 14A of the first lineal being in communication with the hollow interior 14B of the second lineal.

In order to form the corner, the corner is turned so that it is arranged with the apex 14C at the bottom and with the first and second lineals 11, 12 diverging upwardly and outwardly from the corner and the apex 14C.

With the corner in this orientation, a liquid material 17, as described herein, is introduced by pouring or injecting the liquid material 17 into the corner through a feed hole 16 so as to collect at the butting peripheral walls 11A, 12A at the corner apex 14C and to extend from the butting peripheral walls 11A, 12A upwardly at least partly into the first and second lineals 11, 12 as shown at 17A, 17B to a distance to fill the hollow interiors or the first and second lineals at the corner. Thus the liquid is filled to a filled level 17C which is slightly beyond the apex 14D at the innermost end of the edges 11A and 12A.

As explained previously, the liquid 17 has a viscosity selected so that the liquid is held by its viscosity from escaping between the butting edges 11A and 12A of the peripheral walls. That is, it is held by surface tension from escaping through the narrow slot necessarily formed between two cut ends. It will be appreciated that a liquid, such as water, may escape between two edges held in contact. In an embodiment, the viscosity of the liquid 17 is above that of water. In an example, the viscosity of the liquid 17 is greater than about $8.90 \times 10^{-4}$ (8.9E-4) Pa·s at about 25° C.

As explained previously, the liquid 17 has a viscosity selected so that the liquid flows from the hole 16 to a position within the first and second lineals 11, 12 to the fill line 17C which is substantially at the same height.

This viscosity is selected as previously described to allow the material to self-level within a few seconds or minutes and to avoid leaking from the butting edges at the joint. Leaking may be inhibited by the addition of a sealing agent between the edges or by an external resilient sealing member which presses against the edges.

The liquid is formed from suitable material as described so that the liquid sets into a solid material which forms a structural member extending between the first and second lineals to hold the lineals connected at the corner. The liquid is selected so that the solid material bonds to the interior surfaces 13A to 13D of the lineals to hold the member in place and thus hold the lineals against separation. It will be noted that the liquid contacts all of the surfaces of the interior of the lineals and thus acts to bond to all of these surfaces.

With selection of the suitable viscosity as set out above, the solid material seals the butting edges 11A, 12A of the peripheral walls, that is it penetrates partly between these edges to act as a seal to prevent subsequent penetration of moisture or other materials. In addition the presence of the solid material within the hollow interior prevents the entry of air or moisture into the corner to prevent its passage through the corner of the frame. In FIG. 5, it will be noted that there is a flange F which is formed by a single thickness of the wall so that flange does not form part of the hollow interior. In this arrangement, it may be necessary to apply a sealant between the edges 11A and 12A at least at the flange F to provide a sealing effect to prevent air and moisture penetration through the junction between the flanges F of the two lineals 11 and 12. Where the whole or a substantial portion of the cross-section of the lineal (and thus the flange F) is hollow (not shown) such that the solid material plugs the whole or a substantial portion of the corner, the use of a sealant at the corner may be precluded. This may be advantageous in cases in which the sealant a the corner mars the external appearance of the frame if not property applied.

In some embodiments, the solid material is selected to provide the required structural strength such that the structural member at the corner is formed solely by the solid material. That is, in certain cases the structural strength required is not greater than can be provided by the material itself However, in some cases where a higher level of strength is required, it may be desirable to insert or bury a reinforcing element 18. This is formed, for example, of one or more metals, such as a stamped metal member engaged into the solid material. In an example, this reinforcing member 18 does not form the corner member, but acts to reinforce the structural member.

Thus the insert member 18 is located within the solid material during the pouring of the liquid by providing on the at least one insert projecting elements 18A for engaging at least one of the interior surfaces 13D of the first and second lineals. Other surfaces are left wholly exposed so that they bond only to the solid material 17. Even in respect of the surface 13D, the projecting elements extend only over a limited extent of the surface 13D. That is, finger members 18A engage the surfaces to hold the insert in place during the pouring (or injection) of the liquid and movement of the frame to a predetermined (or required) orientation, but do not act to cause jamming of the insert against opposed surfaces which would interfere with the entry of the liquid to all surfaces. The insert in such a case does not fill the hollow interior, but rather sits in the hollow interior at a required location until the liquid is poured around it. Thus, the insert, if applied, may form only a small proportion of the cross-sectional area of the lineal at the corner, such as less than about 50%, or less than 30%, or less than 15%, or less than 10%, or less than 5%, or less than 1%.

Figure 6:
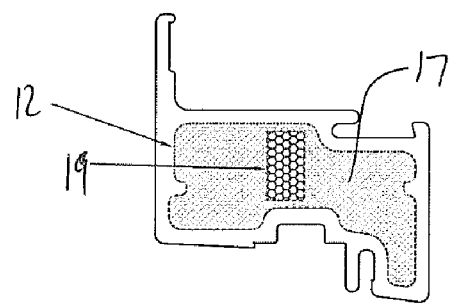
FIG. 6 is a cross-sectional view similar to FIG. 5 showing a member of reduced thermal conductivity within the solid material forming the structural corner member.

FIG. 6 shows an alternative arrangement where the solid material contains one or more inserts or filler elements 19 which act to reduce the thermal conductivity of the frame at the corner by providing a volume within the solid material of reduced thermal conductivity. The inserts do not themselves provide the strength and bonding action of the corner member but are used as fillers. In place of the insert 19 which may be a foam material, the same reduced thermal conductivity may be obtained by causing the liquid to foam by forming voids, to an extent sufficient to provide the required reduced thermal conductivity while not reducing the strength to a value which is insufficient to meet industry standards.

Figure 7:
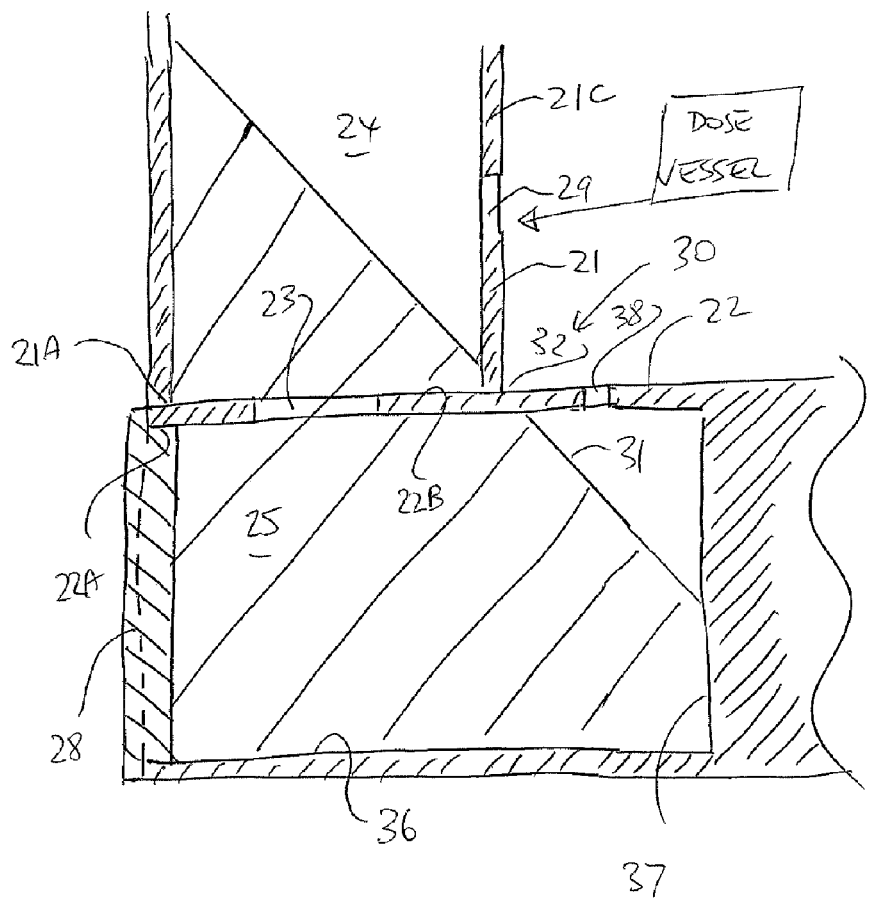
FIG. 7 is a cross-sectional view through a further embodiment of the invention where the lineals are of different cross-section so that they cannot be mitered but are instead butt jointed.

Turning now to FIG. 7, there is shown an alternative arrangement in which the lineals 21 and 22 are of different cross-section and an end 21A of the first 21 is butted to a face 22B of the second 22. This is a corner arrangement where the lineals are of different cross-sections so that a miter joint cannot be formed. In this case, the face 22B of the second lineal 22 is arranged to include an opening 23 so as to provide communication between the hollow interior 24 of the first lineal 21 and the hollow interior 25 of the second lineal 22. In this case, the end face 22A of the second lineal 22 is capped by an end cap 28 to close the end thereof Thus the liquid when introduced through a hole 29 drilled in the first lineal 21 adjacent the corner 30 again fills the corner up to a fill line 31 just beyond the apex 32 of the corner 30 where the inner wall 21C of the lineal 21 meets the face 22B of the lineal 22. The liquid may be poured from a dose vessel 35 or from an injector system but is not necessarily intended to be under pressure when injected as its viscosity is such that it can flow freely to the self leveled condition at the level 31 thus avoiding the necessity for pressure injection. In some situations, however the liquid may be under pressure to aid in applying the liquid. A measured dose may be applied in a manufacturing situation since the amount required to reach the required settled height 31 can be calculated.

In an embodiment, the lineal 21 can be of a pultruded material and the lineal 22 can be for example of wood or another material (e.g., a composite material) for attachment of the lineal 22 to, for example, a wood frame member 22. In this case, the hollow interior 25 is formed as a drilled hole 36 with a closed base 37. In this case to allow the liquid to enter and fill the hollow interior up to the fill line 31, a bleed hole 38 is provided.

In another arrangement (not shown), the lineals are not closed in that the wall does not fully surround the hollow interior so that the lineal is of the type known as an open back lineal. The corner construction described herein can be used with such lineals by providing a cover piece which fastens to the lineals over the open area to enclose the hollow interior for the pour, with the cover either forming a part of the finished construction or being later removed.

Systems and methods provided herein may be combined with, or modified by, other systems and methods, such as, for example, systems and/or methods described in U.S. Patent Pub. No. 2005/0115178 to Schmidt ("CORNER KEY FOR CONNECTING PROFILES TOGETHER AND FRAME WORK ASSEMBLY") and U.S. Pat. No. 7,634,880 to Sironko et al. ("FOAM SEAL FRAME CORNER JOINT AND METHOD OF MANUFACTURE"), which are entirely incorporated herein by reference.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of embodiments of the invention herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for forming a frame comprising:
   providing a plurality of lineals each defined by a peripheral wall having interior surfaces defining a hollow interior;
   forming at least one corner between the lineals so as to complete the frame defined by the plurality of the lineals and at least one corner between the lineals;
   wherein said at least one corner is formed by the steps of:
      butting an end of a first lineal with a second lineal at the corner so that an edge of the peripheral wall of the first lineal contacts the second lineal with the hollow interior of the first lineal being in communication with the hollow interior of the second lineal;
      arranging the corner with the butting peripheral walls of the first and second lineals at a bottom with the first and second lineals diverging upwardly and outwardly from the corner;
      introducing into the corner a settable liquid material so as to flow to and collect at the corner and to extend from corner upwardly at least partly into the first and second lineals to a distance to a level to fill the hollow interiors of the first and second lineals at the corner;
      providing in the liquid a viscosity selected so that the liquid settles at a position within the first and second lineals which is substantially at the same height up the first and second lineals from the corner;
      causing the liquid to set into a solid material;
      arranging the solid material so that the solid material forms a structural member extending between the first and second lineals to hold the lineals connected at the corner;
      and arranging the solid material so that the solid material bonds to the interior surfaces of the lineals to hold the lineals against separation.

2. The method according to claim 1 including providing in the liquid a viscosity selected so that the liquid is held by its viscosity from escaping between the butting edges of the peripheral walls.

3. The method according to claim 1 wherein there is provided a sealing material between the butting edges so as to inhibit escape of the liquid from the corner through the butting edges.

4. The method according to claim 1 wherein the solid material seals the butting edges of the peripheral walls to prevent air and moisture penetration through the corner.

5. The method according to claim 1 wherein the liquid is introduced to an amount to just cover the whole of the butting edges of the peripheral walls without extending through the full extent of the first and second lineals.

6. The method according to claim 1 wherein the liquid is introduced through a hole in at least one of the first and second lineals adjacent the corner and located above the level of the liquid in the corner.

7. The method according to claim 1 wherein the liquid is arranged such that at least a part of the solid material does not foam to provide voids in the solid material.

8. The method according to claim 1 wherein the liquid is arranged such that the solid material foams to provide voids with the amount of voids being controlled to ensure that a strength of the corner to resist bending, as defined by the structural member, meets industry standards.

9. The method according to claim 1 wherein the peripheral wall continuously surrounds the hollow interior to form a closed part.

10. The method according to claim 1 wherein the lineals are formed from the same material.

11. The method according to claim 1 wherein the lineals are formed from pultruded material.

12. The method according to claim 1 wherein the lineals are mitered at the corner so that the edges of the peripheral wall of the first lineal directly butt against the edges of the peripheral wall of the second lineal.

13. The method according to claim 1 wherein the lineals are of different cross-section and an end of the first lineal is butted to a face of the second lineal, the face of the second lineal being arranged to include an opening communicating with the hollow interior of the second lineal and the second lineal being capped to close an end thereof.

14. The method according to claim 1 wherein the settable liquid material is cured so as to form the solid material after a predetermined time period arranged to give sufficient time for the liquid to enter and to settle to the same height before curing occurs.

15. The method according to claim 1 wherein the frame includes at least three lineals and at least two corners and wherein, after the liquid has set at said at least one corner, the frame is rotated to move a second one of said at least two corners to the bottom where the liquid material is introduced.

16. A method for forming a frame comprising:
    providing a plurality of lineals each defined by a peripheral wall having interior surfaces defining a hollow interior;
    forming at least one corner between the lineals so as to complete the frame defined by the plurality of the lineals and at least one corner between the lineals;
    wherein said at least one corner is formed by the steps of:
       butting an end of a first lineal with a second lineal at the corner so that an edge of the peripheral wall of the first lineal contacts the second lineal with the hollow interior of the first lineal being in communication with the hollow interior of the second lineal;
       providing at the corner a rigid insert member comprising a plurality of projections to space the rigid insert member from the interior surfaces of the first and second lineals;
       arranging the corner with the butting peripheral walls of the first and second lineals at a bottom with the first and second lineals diverging upwardly and outwardly from the corner;
       introducing into the corner a settable liquid material so as to flow to and collect at the corner and to extend from corner upwardly at least partly into the first and second lineals to a distance to a level to fill the hollow interiors of the first and second lineals at the corner;
       wherein the flow of the liquid contacts all of the interior surfaces of the first and second lineals;
       providing in the liquid a viscosity selected so that the liquid flows into the first and second lineals;
       causing the liquid to set into a solid material;
       arranging the solid material so that the solid material forms a structural member extending between the first and second lineals to hold the lineals connected at the corner and the buried rigid insert member within the solid material;
       and causing the solid material to bond to the interior surfaces of the lineals to hold the lineals against separation.

17. The method according to claim 16 wherein said at least one insert extends from the hollow interior of the first lineal to the hollow interior of the second lineal to provide a reinforcing bar providing additional strength to the structural member.

18. The method according to claim 16 wherein said at least one insert comprises a material of lower thermal conductivity than the solid material so as to reduce the thermal conductivity of the frame at the corner.

19. A method for forming a frame comprising:
   providing a plurality of lineals each defined by a peripheral wall having interior surfaces defining a hollow interior;
   forming at least one corner between the lineals so as to complete the frame defined by the plurality of the lineals and at least one corner between the lineals;
   wherein said at least one corner is formed by the steps of:
      butting an end of a first lineal with a second lineal at the corner so that an edge of the peripheral wall of the first lineal contacts the second lineal with the hollow interior of the first lineal being in communication with the hollow interior of the second lineal;
      arranging the corner with the butting peripheral walls of the first and second lineals at a bottom with the first and second lineals diverging upwardly and outwardly from the corner;
      introducing into the corner a settable liquid material so as to flow to and collect at the corner and to extend from corner upwardly at least partly into the first and second lineals to a distance to a level to fill the hollow interiors of the first and second lineals at the corner;
   providing in the liquid a viscosity selected so that the liquid flows into the first and second lineals to contact all of the interior surfaces and to fill the hollow interior thereof;
   causing the liquid to set into a solid material;
   arranging the solid material so that the solid material forms a structural member extending between the first and second lineals to hold the lineals connected at the corner;
      wherein the structural member is formed solely by the solid material without any rigid insert; and
   arranging the solid material so that the solid material bonds to all of the interior surfaces of the lineals to hold the lineals against separation.

\* \* \* \* \*